(12) United States Patent
Pickett et al.

(10) Patent No.: US 10,279,766 B2
(45) Date of Patent: May 7, 2019

(54) LOW STRESS ATTACHMENT FOR HIGH GLOSS WEATHERABLE POLYCARBONATE DECORATIVE APPLICATIONS

(71) Applicant: GM GLOBAL TECHNOLOGY OPERATIONS LLC, Detroit, MI (US)

(72) Inventors: Thomas J. Pickett, Warren, MI (US); Robert Dallos, Jr., Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 110 days.

(21) Appl. No.: 15/625,235

(22) Filed: Jun. 16, 2017

(65) Prior Publication Data

US 2018/0361970 A1    Dec. 20, 2018

(51) Int. Cl.
| | |
|---|---|
| C08G 63/02 | (2006.01) |
| B60R 19/52 | (2006.01) |
| B32B 7/08 | (2019.01) |
| B32B 7/12 | (2006.01) |
| B32B 27/08 | (2006.01) |
| B32B 27/30 | (2006.01) |
| B32B 27/36 | (2006.01) |
| B32B 13/04 | (2006.01) |

(52) U.S. Cl.
CPC ............ *B60R 19/52* (2013.01); *B32B 7/08* (2013.01); *B32B 7/12* (2013.01); *B32B 13/04* (2013.01); *B32B 27/08* (2013.01); *B32B 27/302* (2013.01); *B32B 27/365* (2013.01); *B32B 2307/402* (2013.01); *B32B 2307/406* (2013.01); *B32B 2605/00* (2013.01); *B60R 2019/525* (2013.01)

(58) Field of Classification Search
USPC .................................................. 428/411, 412
See application file for complete search history.

(56) References Cited

U.S. PATENT DOCUMENTS

2006/0135699 A1* 6/2006 Li ........................... C08L 23/10
525/240

* cited by examiner

*Primary Examiner* — Terressa Boykin
(74) *Attorney, Agent, or Firm* — Quinn IP Law

(57) ABSTRACT

A vehicle body assembly includes a first body wholly or partly made of a first polymeric material. The first polymeric material includes a polycarbonate and has a 60-degree gloss that is equal to or greater than 80 gloss units. The first body defines an outermost surface of the vehicle body assembly. The first body may be an exterior trim component, such as a grille portion, and may have a black color. The vehicle body assembly further includes a second body coupled (e.g., chemically bonded) to the first body. The second body may be a support body configured to support the exterior trim component and is wholly or partly made of a second polymeric material. The second polymeric material is different from the first polymeric material, and the outermost surface of the first body faces away from the second body.

19 Claims, 1 Drawing Sheet

US 10,279,766 B2

LOW STRESS ATTACHMENT FOR HIGH GLOSS WEATHERABLE POLYCARBONATE DECORATIVE APPLICATIONS

The present disclosure relates to a low stress attachment for high gloss weatherable polycarbonate decorative applications.

Vehicles, such as cars, usually include decorative exterior applications. As non-limiting examples of decorative exterior applications, vehicles sometimes include grilles and other exterior trim parts such as spoilers, hood vents, fender vents, appliques, and license plates.

SUMMARY

Polycarbonate crazes and/or cracks when exposed to various chemicals (e.g., alcohol, car wash chemicals, etc.) if stressed 0.5% or greater. Such crazes and cracking are known as Environmental Stress Cracking (ESC). According to the American Society of Testing Materials (ASTM) D833 document, stress cracking is "an external or internal crack in a plastic caused by tensile stresses less than its short-term mechanical strength." ESC is a type of stress cracking that occurs when a polymer is exposed to surface active wetting agents, such as alcohols, surfactants, soaps, among others. The ability of a polymer to resist environmental stress cracking is known as Environmental Stress Cracking Resistance (ESCR).

In certain embodiments, the vehicle body assembly includes a first body wholly or partly made of a first polymeric material. The vehicle body assembly is part of a vehicle, such as a car. The first polymeric material includes a polycarbonate (PC) and has a 60-degree gloss that is equal to or greater than 80 gloss units. The first body defines an outermost surface of the vehicle body assembly. The first body may be an exterior trim component, such as a grille portion, and may have a black color. For example, the entire first body may be black. The vehicle body assembly further includes a second body coupled (e.g., chemically bonded) to the first body. The second body may be a support body configured to support the exterior trim component and is wholly or partly made of a second polymeric material. The second polymeric material is different from the first polymeric material, and the outermost surface of the first body faces away from the second body.

The first polymeric material has a first melt-mass flow rate, and the second polymeric material has a second melt-mass flow rate. The second melt-mass flow rate is less than the first melt-mass flow rate. Accordingly, the ESCR of the second polymeric material is greater than the ESCR of the first polymeric material. Because the first body has a high gloss (i.e., a 60-degree gloss that is equal to or greater than 80 gloss units) measured at the outermost surface, the first body does not include a paint or coating on its outermost surface. The first melt-mass flow rate may be equal to or less than 18 grams per 10 minutes.

In certain embodiments, the second polymeric material is wholly or partly made of an acrylonitrile butadiene styrene (ABS), an ABS/PC blend, an alkenyl succinic anhydride (ASA) and/or ASA/PC blend. The vehicle body assembly further includes a vehicle body wholly or partly made of a metallic material. The second body may be directly coupled to the vehicle body. A fastener may extend through the vehicle body and the second body to couple the vehicle body to the second body. The first polymeric material has a first delta yellowness index, and the second polymeric material has a second delta yellowness index. The first delta yellowness index may be less than the second yellowness index. The first polymeric material may have a delta yellowness index that is equal to or less than 5. An adhesive may interconnect the vehicle body and the second body.

The above features and advantages and other features and advantages of the present disclosure are readily apparent from the following detailed description of the best modes for carrying out the disclosure when taken in connection with the accompanying drawings.

DETAILED DESCRIPTION

Figure 1:
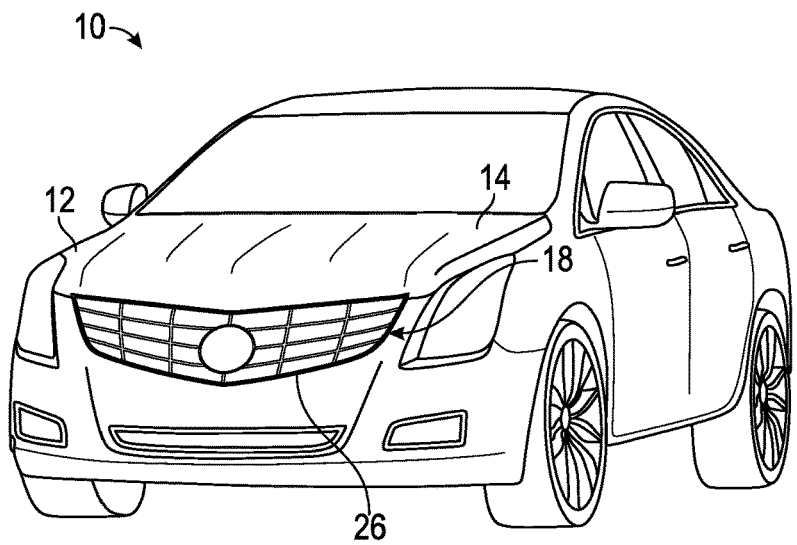
FIG. 1 is a schematic isometric front view of a vehicle including vehicle body assembly, wherein the vehicle body assembly includes a grille.
Figure 2:
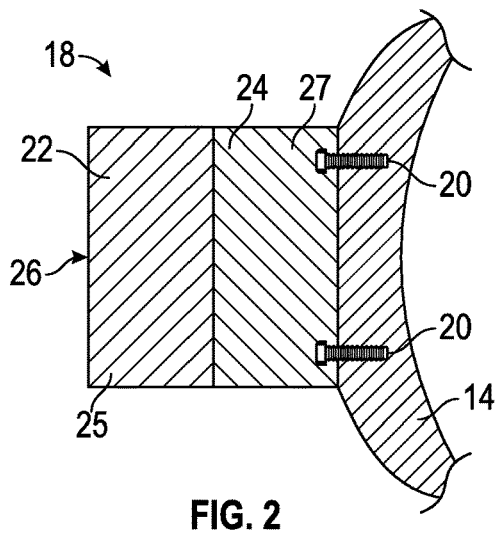
FIG. 2 is a schematic, cross-sectional view of the vehicle body assembly of FIG. 1.

FIGS. 1 and 2 schematically show a vehicle 10 including a vehicle body assembly 12. Although the vehicle 10 is illustrated as a car, it is contemplated that the vehicle 10 may be a truck or any other vehicle suitable for transporting objects or passengers. The vehicle body assembly 12 includes a vehicle body 14 and an exterior trim feature 18 coupled the vehicle body 14. The vehicle body 14 is wholly or partly a metallic material, such as steel or aluminum. The exterior trim feature 18 may be directly coupled to the vehicle body 14 to enhance the structural integrity of the vehicle 10. As a non-limiting example, one or more fasteners 20 (e.g., screws, bolts, bosses, snap fits, etc.) extend through the vehicle body 14 and the exterior trim feature 18 to couple the exterior trim feature 18 to the vehicle body 14. In the depicted embodiment, the exterior trim feature 18 is a grille. However, it is envisioned that the exterior trim feature 18 may be configured as spoilers, hood vents, fender vents, appliques, license plates and/or any other trim component.

The exterior trim feature 18 includes a first body 22 and a second body 24 coupled (e.g., chemically bonded) to each other. The first body 22 defines an outermost surface 26 of the vehicle body assembly 12. The outermost surface 26 of the first body 22 faces away from the second body 24. The first body 22 may be an exterior trim component 25, such as a grille portion, and may have a black color or other colors. For example, the entire first body 22 may be black or another color. It is contemplated that the entire exterior trim feature 18 (i.e., the first body 22 and the second body 24) may be black or another color.

The first body 22 is wholly or partly made of a first polymeric material, which includes a polycarbonate (PC). The first polymeric material has a high gloss (i.e., a 60-degree gloss that is equal to or greater than 80 gloss units) at the outermost surface 26 to enhance the aesthetic appearance of the vehicle 10. In the present disclosure, the gloss is measured at the outermost surface 26 using the ASTM D523 Standard Test for Measuring Specular Gloss. Because the first body 22 has a high gloss (i.e., a 60-degree gloss that is equal to or greater than 80 gloss units) measured at the outermost surface 26, the first body 22 does not include a paint or coating on its outermost surface 26. In other words, no paint or coating is needed to enhance the gloss of the first body 22 at the outermost surface 26. By eliminating paint and/or coating, the time it takes to manufacture the vehicle body assembly 12 can be minimized. As non-limiting examples, the second polymeric material may be the polycarbonate materials sold by Sabic under the trade names LEXAN™ SLX2271T and LEXAN™ SLX1432.

The vehicle body assembly 12 further includes the second body 24, which is coupled (e.g., chemically bonded) to the first body 22. In the depicted embodiment, the first body 22 is directly coupled (e.g., bonded) to the second body 24 to enhance the structural integrity of the vehicle body assembly 12. The second body 24 may be a support body 27 configured to support the exterior trim component 25. Further, the second body 24 is wholly or partly made of a second polymeric material that is different from the first polymeric material. As non-limiting examples, the second polymeric material is wholly or partly made of an acrylonitrile butadiene styrene (ABS), an ABS/PC blend, an alkenyl succinic anhydride (ASA) and/or ASA/PC blend or any suitable material capable of bonding to the first polymeric material of the first body 22. As such, the second body 24 can be chemically bonded to the first body 22.

Polycarbonate crazes and/or cracks when exposed to various chemicals (e.g., alcohol, car wash chemicals, etc.) if stressed 0.5% or greater. Such crazes and cracking are known as Environmental Stress Cracking (ESC). According to the American Society of Testing Materials (ASTM) D833 document, stress cracking is "an external or internal crack in a plastic caused by tensile stresses less than its short-term mechanical strength." ESC is a type of stress cracking that occurs when a polymer is exposed to surface active wetting agents, such as alcohols, surfactants, soaps, among others. The ability of a polymer to resist environmental stress cracking is known as Environmental Stress Cracking Resistance (ESCR). Because the second body 24 is coupled to the vehicle body 14, the second body 24 may be subjected to more strain than the first body 22. For this reason, it is desirable to minimize crazes and/or cracks in the second body 24 when exposed to various chemicals (e.g., alcohol, car wash chemicals, etc.) and is stressed 0.5% or greater.

Molecular weight influences ESCR. Materials with higher molecular weight exhibit higher ESCR than other materials with a lower molecular weight. As discussed above, the second body 24 may be coupled to the vehicle body 14 and may be more subject to strain as compared to the first body 22. Thus, the ESCR of the second body 24 should be higher than the ESCR of the first body 22. Because it is desirable to maximize the ESCR of the second body 24 as compared to the first body 22, the second polymeric material of the second body 24 should have a higher molecular weight than the first polymeric material of the first body 22. Therefore, the molecular weight of the first polymeric material may be lower than the molecular weight of the material polymeric material in order to efficiently use materials in the vehicle 10.

The molecular weight can be indirectly measured with the melt-mass flow rate. Materials with lower melt-mass flow rate have a higher molecular weight, and vice-versa. In the present disclosure, the melt-mass flow rate is determined using the ASTM D1238 Standard, wherein, for polycarbonate materials, the test is performed at 300° C. with a 1.2 kilogram-mass.

Because it is desirable to maximize the ESCR of the second body 24 as compared to the first body 22, the melt-mass flow rate of the second polymeric material (i.e., the second melt-mass flow rate) is less than the melt-mass flow rate of the first polymeric material (i.e., the first melt-mass flow rate). Accordingly, the ESCR of the second polymeric material is greater than the ESCR of the first polymeric material. As a non-limiting example, the melt-mass flow rate of the first polymeric material may be equal to or less than 18 grams per 10 minutes.

As discussed above, the first body 22 defines the outermost surface 26 of the vehicle 10. Accordingly, the first body 22 may be exposed to sunlight during operation of the vehicle 10. Thus, the first body 22 should be weatherable. In other words, the first polymeric material of the first body 22 should be resistant to degradation due to exposure to sunlight. The second body 24, on the other hand, is not as exposed to sunlight as the first body 22. Thus, the second body 24 does not need to be as resistant to degradation as the first body 22. To this end, delta yellowness index ($\Delta YI$) of the first polymeric material (i.e., first yellowness index) may be less than the delta yellowness index ($\Delta YI$) of the second polymeric material (i.e., the second yellowness index). In the present disclosure, the delta yellowness index is determined using the ASTM E313-73 Standard. As a non-limiting example, the delta yellowness index ($\Delta YI$) of the first polymeric material may be equal to or less than 5.

Figure 3:
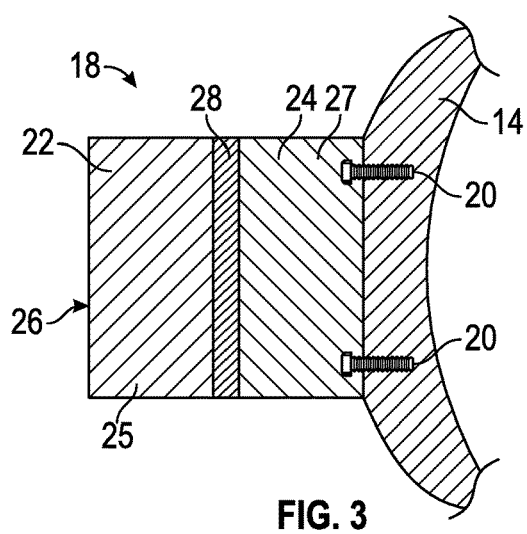
FIG. 3 is a schematic, cross-sectional view of a vehicle body assembly in accordance with an embodiment of the present disclosure.

With reference to FIG. 3, an adhesive 28 can directly interconnect the first body 22 and the second body 24. Thus, in the depicted embodiment, the first body 22 is not directly coupled to the second body 24. The adhesive 28 can be configured as a layer. As a non-limiting example, the adhesive 28 may be a double-sided tape.

Figure 4:
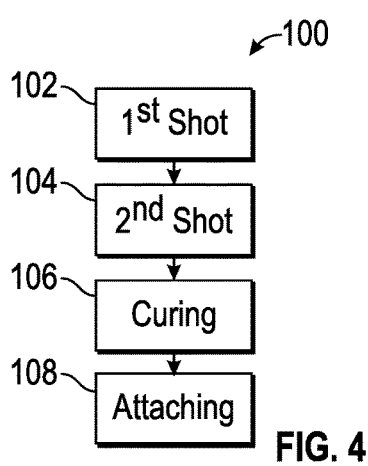
FIG. 4 is a flowchart of an injecting molding process for forming part of the vehicle body assembly shown in FIG. 1.

With reference to FIG. 4, the presently disclosed vehicle body assembly 12 may be manufactured using a two-shot injection molding method 100. In this method 100, at block 102, the first polymeric material is first injected into a first cavity of a mold. The first cavity of the mold is shaped as the first body 22. Then, at block 104, the second polymeric material is injected into a second cavity of the mold. The second cavity of the mold is shaped as the second body 24 and is disposed adjacent the first cavity of the mold. Afterwards, at block 106, the first polymeric material and the second polymeric material are completely cured. As a result, the first polymeric material is bonded to the second polymeric material to form at least part of the vehicle body assembly 12. Then, at block 108, the first body 22 and the second body 24, which are now bonded together, can be attached to the vehicle body 14 using fasteners 20 (e.g., screws, bosses, snap fits, etc.). Alternatively, the vehicle body assembly 12 can be manufactured using compression molding, over molding, bonding, or any suitable manufacturing method.

While the best modes for carrying out the disclosure have been described in detail, those familiar with the art to which this disclosure relates will recognize various alternative designs and embodiments for practicing the disclosure within the scope of the appended claims.

What is claimed is:
1. A vehicle body assembly, comprising:
a first body including a first polymeric material, wherein the first polymeric material includes a polycarbonate, the first body defines an outermost surface of the vehicle body assembly, the first polymeric material has a 60-degree gloss that is equal to or greater than 80 gloss units at the outermost surface;
a second body chemically bonded to the first body, wherein the second body includes a second polymeric material, the second polymeric material is different from the first polymeric material, the second polymeric material includes an alkenyl succinic anhydride, and the outermost surface of the first body faces away from the second body; and wherein the first polymeric material has a first melt-mass flow rate, the second polymeric material has a second melt-mass flow rate, the second melt-mass flow rate is less than the first melt-mass flow rate, each of the first melt-mass flow rate and the second melt-mass flow rate is determined using an ASTM D1238 Standard, a test to determine each of the first melt-mass flow rate and the second melt-mass flow rate is performed at 300° C., and the first melt-mass flow rate is equal to or less than 18 grams per 10 minutes.

2. The vehicle body assembly of claim 1, wherein the first body is characterized by the absence of a paint on the outermost surface of the first body.

3. The vehicle body assembly of claim 1, wherein the first body is characterized by the absence of a coating on the outermost surface of the first body.

4. The vehicle body assembly of claim 1, wherein the second polymeric material includes an acrylonitrile butadiene styrene.

5. The vehicle body assembly of claim 1, wherein the second polymeric material includes an acrylonitrile butadiene styrene/polycarbonate blend.

6. A vehicle body assembly, comprising:
a first body including a first polymeric material, wherein the first polymeric material includes a polycarbonate, the first body defines an outermost surface of the vehicle body assembly, the first polymeric material has a 60-degree gloss that is equal to or greater than 80 gloss units at the outermost surface;
a second body chemically bonded to the first body, wherein the second body includes a second polymeric material, the second polymeric material is different from the first polymeric material, and the outermost surface of the first body faces away from the second body; and
wherein the first polymeric material has a first melt-mass flow rate, the second polymeric material has a second melt-mass flow rate, the second melt-mass flow rate is less than the first melt-mass flow rate, each of the first melt-mass flow rate and the second melt-mass flow rate is determined using an ASTM D1238 Standard, a test to determine each of the first melt-mass flow rate and the second melt-mass flow rate is performed at 300° C., and the first melt-mass flow rate is equal to or less than 18 grams per 10 minutes; and
wherein the second polymeric material includes an alkenyl succinic anhydride/polycarbonate blend.

7. The vehicle body assembly of claim 1, further comprising a vehicle body, wherein the vehicle body includes a metallic material.

8. The vehicle body assembly of claim 7, wherein the second body is directly coupled to the vehicle body.

9. The vehicle body assembly of claim 7, further comprising a fastener extending through the vehicle body and the second body to couple the vehicle body to the second body.

10. A vehicle, comprising:
a first body including a first polymeric material, the first polymeric material including a polycarbonate, the first body defining an outermost surface of the vehicle, the first body being an exterior trim component;
a second body coupled to the first body, the second body including a second polymeric material, the second polymeric material being different from the first polymeric material, the outermost surface of the first body facing away from the second body, the second body being a support body configured to support the exterior trim component;
wherein the first polymeric material has a first melt-mass flow rate, the second polymeric material has a second melt-mass flow rate, and the second melt-mass flow rate is less than the first melt-mass flow rate;
a vehicle body coupled to the second body, wherein the vehicle body includes a metallic material; and
a fastener extending through the vehicle body and the second body to interconnect the vehicle body and the second body.

11. The vehicle of claim 10, wherein the first body is characterized by the absence of a paint on the outermost surface of the first body.

12. The vehicle of claim 11, wherein the first body is characterized by the absence of a coating on the outermost surface of the first body.

13. The vehicle of claim 12, wherein the second polymeric material is selected from a group consisting of acrylonitrile butadiene styrene, an acrylonitrile butadiene styrene/polycarbonate blend, alkenyl succinic anhydride, and alkenyl succinic anhydride/polycarbonate blend.

14. The vehicle of claim 13, wherein the first polymeric material has a first delta yellowness index, the second polymeric material has a second delta yellowness index, and the first delta yellowness index is less than the second delta yellowness index.

15. The vehicle of claim 14, wherein the first delta yellowness index is equal to or less than 5.

16. The vehicle of claim 15, wherein an entirety of the first body has a black color.

17. The vehicle of claim 16, wherein the first body is chemically bonded to the second body, and the first body is directly coupled to the second body.

18. The vehicle of claim 17, wherein the first melt-mass flow rate is equal to or less than 18 grams per 10 minutes.

19. The vehicle of claim 10, further comprising an adhesive interconnecting the vehicle body and the second body.

* * * * *